UNITED STATES PATENT OFFICE.

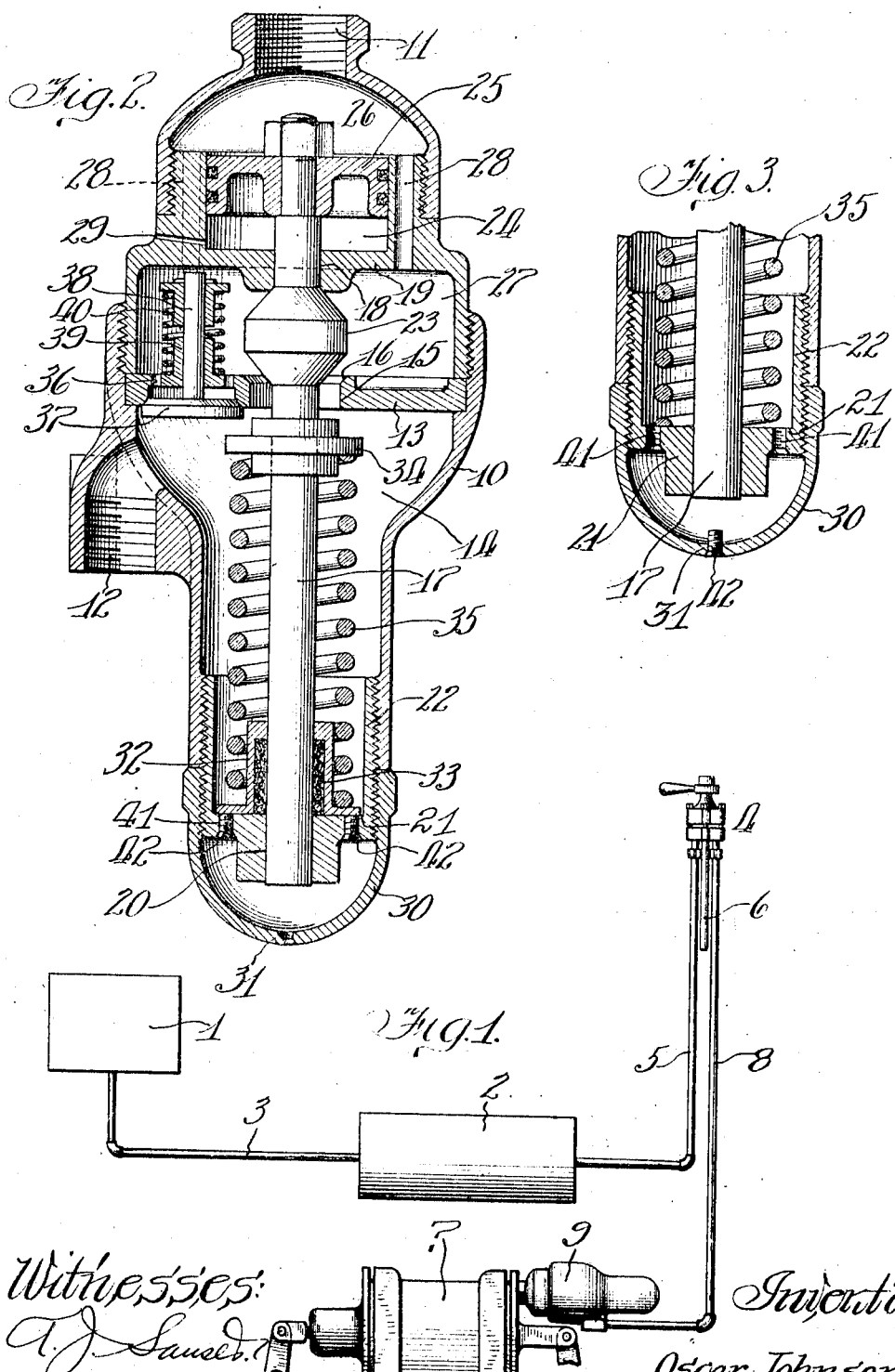

OSCAR JOHNSON, OF CHICAGO, ILLINOIS.

AIR-BRAKE APPARATUS.

1,041,091.   Specification of Letters Patent.   Patented Oct. 15, 1912.

Application filed May 18, 1911. Serial No. 627,918.

*To all whom it may concern:*

Be it known that I, OSCAR JOHNSON, a citizen of the United States, residing at Chicago, in the county of Cook and State of Illinois, have invented certain new and useful Improvements in Air-Brake Apparatus, of which the following is a specification.

The object of this invention is to provide means in a straight air-brake system for reducing the pressure fluid from the pressure carried in the reservoir to that used in the brake-cylinder; for returning the pressure fluid to the engineer's brake valve; and for producing a quick release of the pressure in the brake cylinder.

Pressure-reducing valves have heretofore been employed in air-brake systems, but they have been located at points remote from the brake cylinder, whereby the action of the brakes has been delayed owing to fluctuations of pressure in the piping.

One of the objects of my invention is to produce a pressure reducing valve adapted to be located close to the brake cylinder, thus making the brakes more quickly responsive to actuations of the engineer's valve.

In the accompanying drawings, Figure 1 is a diagram illustrating the invention as embodied in an air-brake system. Fig. 2 is a longitudinal central section through the valve. Fig. 3 is a fragmental sectional view illustrating a change in the construction.

In the embodiment which I have chosen to illustrate the invention, 1 is an air compressor, 2 is a compressed air reservoir connected to the compressor by means of the pipe 3, 4 is an engineer's brake valve connected to the reservoir 2 by means of a pipe 5 and provided with an exhaust pipe 6, and 7 is a brake cylinder connected to the engineer's brake valve by means of the brake pipe 8. It is customary to maintain a higher pressure in the reservoir 2 than it is desirable to use in the brake cylinder. To reduce the main reservoir pressure of say ninety pounds, to that required for the brake cylinder, say fifty pounds, I insert a pressure-reducing valve 9 in the line between the engineer's brake valve and the brake cylinder. The valve 9 may be attached directly to the brake cylinder, if space permits, or may be inserted in the brake pipe at a point near the brake cylinder.

The pressure-reducing valve 9 comprises a casing 10 of any suitable form and construction, 11 being a passage connecting the casing to the brake cylinder, and 12 being means for connecting the casing to the brake pipe. Extending transversely of the casing 9 is a partition 13 providing a chamber 14 in communication with the passage 12. In the partition 13 is a port 15 surrounded by a valve seat 16. A valve stem 17 is slidably mounted in an opening 18 formed in a partition 19 extending transversely of the casing 9, and is guided at one end in an opening 20 formed in the end wall 21 of a sleeve 22 having a screw-threaded connection with the casing 10. Between the partitions 13 and 19, the valve rod 17 is provided with a valve member 23 adapted to be seated upon the seat 16. In the partition 19 is formed a cylindrical chamber constituting a cylinder 24 for a piston 25 fixed to the valve rod 17. The partition 19 provides a head for one end of the cylinder 24, the other end of said cylinder being open and in communication with a chamber 26 connected to the passage 11. The partitions 13 and 19 form between them a chamber 27. The chambers 26 and 27 are in communication by means of a suitable number of passages 28. The space between the piston 25 and the closed end of the cylinder 24 is in constant communication with the atmosphere through a port or vent opening 29.

A cap 30 has a screw thread connection with the sleeve 22 and is provided with a vent opening 31. Leakage of pressure fluid through the opening 20 may be prevented by any suitable means, as for example, a gland 32 containing packing 33. Interposed between the gland 32 or the partition 21 and a projecting portion 34 of the valve rod, is a coiled spring 35 which normally holds the valve 23 unseated, whereby free communication is provided between the passages 11 and 12.

Extending through the partition 13 are one or more ports 36 arranged to be closed by a valve disk 37 fixed upon a stem 38 which is slidably mounted in a guide 39. A spring 40 normally holds the valve disk 37 seated.

The operation is as follows: When the brakes are to be applied, the engineer or motorman operates the engineer's brake valve 4 to permit the flow of pressure fluid from the reservoir 2 through the pipe 5 and the said valve 4 and through the pipe 8 to the passage 12 of the pressure-reducing valve. Thence the pressure fluid passes through the chamber 14, the opening 15, the chamber 27, the passages 28, the chamber 26, and the passage 11 to the brake cylinder 7. When the pressure in the brake cylinder reaches a predetermined point, the fluid pressure upon the piston 25 overcomes the spring 35 and causes the valve 23 to be seated, whereby the flow of pressure fluid to the brake cylinder is cut off.

When the brakes are to be released, the engineer or motorman operates the valve 4 to connect the brake pipe 8 with the exhaust pipe 6, whereupon the pressure fluid in the brake pipe and the chamber 14 escapes to the atmosphere. The pressure in the chamber 14 being thereby reduced, the pressure in the chamber 27 unseats the valve disk 37 against the tension of the spring 40, whereupon the pressure fluid in the brake cylinder begins to exhaust through 11, 26, 28, 27, 36, 14, 12, 8, 4 and 6. When the pressure in the chamber 26 has been somewhat reduced, the spring 35 overcomes the remaining pressure and opens the valve 23, whereupon the remainder of the pressure fluid in the brake cylinder exhausts quickly to the atmosphere.

In order that packing for the valve rod 15 may be dispensed with, when desired, I provide in the end wall 21 of the sleeve 22 a suitable number of openings 41 which may be closed by means of screws 42, the walls of the opening 31 also being screw-threaded so that one of the screws 42 may be placed therein. When it is desired to dispense with packing, the cap 30 is unscrewed from the sleeve 22, the latter unscrewed from the casing 10, the gland 32 removed, the sleeve 22 replaced, the screws 42 removed, the cap 30 replaced, and one of the screws 42 placed in the opening 31. The interior of the cap 30 will then be in communication with the chamber 14. With the parts so arranged, the spring 35 operates against the difference between the fluid pressures on the piston 25 and the end of the valve rod 17.

It has been heretofore proposed to locate the pressure-reducing valve between the source of high-pressure fluid and the engineer's brake-valve. This arrangement, however, necessitates the provision of a special reservoir to contain the fluid of reduced pressure,—a necessity which I obviate by locating the pressure-reducing valve between the engineer's valve and the brake cylinder.

It will be observed that the pressure-reducing valve is adapted to permit the return of the pressure fluid through said valve to the engineer's brake valve, where the escape of the exhaust affords a valuable indication to the operator.

I claim as my invention:

1. In air-brake apparatus, the combination of a source of high-pressure, an engineer's brake valve connected to said source of high pressure and having an exhaust outlet, a brake cylinder, a brake pipe connecting the engineer's brake valve to said brake cylinder; a valve in said brake pipe, means tending to hold the second mentioned valve open, pressure-fluid actuated means for closing the second mentioned valve, the casing for the latter valve containing an outlet for pressure fluid in the brake cylinder to the brake pipe, and means within said casing responsive to pressure in the brake cylinder for opening said outlet.

2. In air-brake apparatus, the combination of a brake cylinder, an air pipe, a valve casing having therein a chamber connected to said air pipe, and another chamber connected to said brake cylinder, a valve member for closing communications between said chambers, a spring tending to unseat said valve member, means responsive to pressure in the brake cylinder for seating said valve, and means for relieving pressure in the brake cylinder so as to permit the spring to unseat said valve member.

3. In air-brake apparatus, the combination of a brake cylinder, an air pipe, a valve casing having therein a chamber connected to said air pipe and another chamber connected to said brake cylinder, a valve member for closing communications between said chambers, a spring tending to unseat said valve member, means responsive to pressure in the brake cylinder for seating said valve member, means in said valve casing responsive to pressure in the second mentioned chamber for permitting the discharge of pressure fluid from the second mentioned chamber to the first mentioned chamber.

In testimony whereof I affix my signature in presence of two witnesses.

OSCAR JOHNSON.

Witnesses:
C. PAUL PARKER,
GEORGE L. CHINDAHL.